United States Patent
Piech et al.

[15] 3,682,018
[45] Aug. 8, 1972

[54] CONNECTING ROD, ESPECIALLY FORKED CONNECTING ROD FOR INTERNAL COMBUSTION ENGINES

[72] Inventors: Ferdinand K. Piech, Stuttgart-Nord; Hans Mezger, Ludwigsburg, both of Germany

[73] Assignee: Firma Dr. Ing. h.c.F. Porsche KG, Porschestrasse, Germany

[22] Filed: Nov. 25, 1970

[21] Appl. No.: 92,693

[30] Foreign Application Priority Data

Dec. 11, 1969 Germany..........P 19 62 116.0

[52] U.S. Cl. .............................................74/579 E
[51] Int. Cl. .............................................F16c 9/00
[58] Field of Search..74/579 E, 579 R, 580; 85/50 R, 85/9 R, 1 R

[56] References Cited

FOREIGN PATENTS OR APPLICATIONS

| 231 | 10/1852 | Great Britain | .............85/50 R |
|---|---|---|---|
| 131,605 | 4/1920 | Great Britain | ...............85/9 R |
| 573,441 | 11/1945 | Great Britain | ...........74/579 E |
| 796,473 | 10/1956 | Great Britain | ...............74/580 |
| 825,329 | 12/1959 | Great Britain | ...........74/579 E |
| 732,187 | 9/1932 | France | ......................85/50 R |
| 878,271 | 1/1943 | France | ....................74/579 E |
| 1,079,393 | 4/1960 | Germany | ...................85/50 R |
| 642,987 | 7/1962 | Italy | .........................74/579 R |

Primary Examiner—William F. O'Dea
Assistant Examiner—F. D. Shoemaker
Attorney—Craig, Antonelli & Hill

[57] ABSTRACT

A connecting rod, especially a forked connecting rod for internal combustion engines, comprising at least a connecting rod foot and a connecting rod bearing cap connected to one another by tension elements or by tension elements and intermediate members. The tension elements and/or the intermediate members associated therewith support themselves with concave support surfaces in corresponding concave countersurfaces in the connecting rod foot and/or the connecting rod bearing cap.

7 Claims, 2 Drawing Figures

PATENTED AUG 8 1972　　　　　　　　3,682,018

Inventors
FERDINAND PIËCH AND HANS MEZGER

BY Craig, Antonelli, Stewart + Hill
ATTORNEYS

CONNECTING ROD, ESPECIALLY FORKED CONNECTING ROD FOR INTERNAL COMBUSTION ENGINES

BACKGROUND OF THE INVENTION

The present invention relates to a connecting rod, especially a forked connecting rod for internal combustion engines, and more particularly, to a connecting rod which consists of at least a connecting rod foot and a connecting rod bearing cap connected to one another by tension elements and/or intermediate members.

With connecting rods of the aforementioned type, a detachable, durable assembly of the connecting rod foot and connecting rod bearing cap must be assured even at high loading. It is known to use tension screws or bolts as a connecting elements which satisfy this requirement.

A connecting rod is known, for example, in which the connecting rod bearing cap is bolted together with the connecting rod foot by means of tension screws having oppositely directed threaded portions as shown in U.S. Pat. No. 3,266,339. Further, a connecting rod is also conventional, wherein the connecting rod bearing cap is bolted together with the connecting rod foot by means of tension screws and nuts as shown in U.S. Pat. No. 3,069,926. In these arrangements, however, the support surfaces of the tension elements and their assigned or associated counter-surfaces respectively are flat. Because of this flat construction, a notch is formed at the counter-surfaces at the transition to the remaining surface of the connecting rod foot and the connecting rod bearing cap, respectively. This notch is usually machined so as to be right-angled, thereby weakening the corresponding cross-section of the connecting rod foot and the connecting rod bearing cap respectively through the increased notch effect which leads to a rupture of the connecting rod in this cross-sectional area under high loading.

SUMMARY OF THE INVENTION

It is an aim of the present invention to overcome the aforementioned problems and disadvantages of the prior art connecting rods.

More particularly, it is an object of the present invention to minimize the danger of fracture without an increase in cost in connection with highly loaded connecting rods as well as the reduction in the width of the connecting rod.

The foregoing problems have been solved in accordance with the present invention by providing that the tension elements and/or the intermediate members associated therewith support themselves with convex support surfaces in corresponding concave counter-surfaces in the connecting rod foot and/or the connecting rod bearing cap.

In an advantageous manner, the convex support surfaces and the corresponding concave counter-surfaces are of spherical shape. The convex support surfaces and the corresponding counter-surfaces are preferably shaped to be circular-cylindrical. It is of further advantage when the radii of the convex support surfaces are made slightly larger than the radii of the corresponding concave counter-surfaces.

It the tension elements are formed as tension bolts or screws, it is advantageous to provide the head of the tension bolts or screws with a circular-cylindrical shaped support surface so that the head supports itself at the counter-surface of the connecting rod bearing cap. If the tension elements are formed as nuts, the nut is preferably formed in such a manner that it is provided with a spherically shaped support surface and is supported at the counter-surface at the connecting rod foot. A washer advantageously serves as the intermediate member which is provided with a flat support surface opposite the corresponding nut and is provided with a spherically shaped support surface adjacent the counter-surface in the connecting rod foot.

The connecting rod in accordance with the present invention results in several advantages, especially in that a uniform and notch-free transition zone is obtained between the counter-surfaces of the connecting rod foot and the adjacent surfaces of the connecting rod bearing cap, respectively. Such a transition zone eliminates the notch effect which is thereby able to avoid fracture under high loading. A further advantage resides in that the support surfaces, if required, may be increased at the tension elements themselves through intermediate members, thereby making a larger tension force possible and being especially favorable for connecting rods made of light weight metal.

A further advantage of the present invention resides in that, through the tension elements and the intermediate members, certain twisting safety is saved. Furthermore, the width of the connecting rod foot and the length of the screw of bolt can be reduced whereby the mass of the connecting rod is reduced, thereby providing a favorable effect on the rotative speed condition of the engine.

BRIEF DESCRIPTION OF THE DRAWING

These and further features, objects and advantages of the present invention will become more apparent from the following description when taken in conjunction with the accompanying drawing which shows, for purposes of illustration only, several embodiments in accordance with the present invention and wherein.

DETAILED DESCRIPTION OF THE DRAWING

Figure 1:
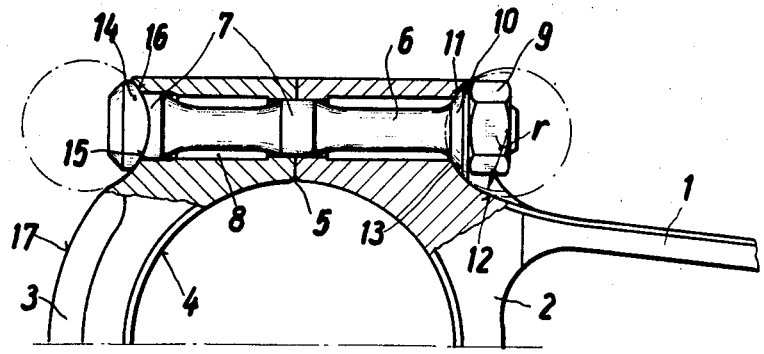
FIG. 1 is a longitudinal cross-sectional view through a half of symmetrical, forked connecting rod for an internal combustion engine including the bolting in accordance with the present invention.

Referring now to the drawing and, in particular, to FIG. 1, the connecting rod consists of a connecting rod body 1 including a forked connecting rod foot 2 and a connecting rod bearing cap 3 to complete the bearing bore 4 which receives the crankshaft (not shown). The connecting rod foot 2 and the connecting rod bearing cap 3 lay parallel or flat against each other to form a parting line 5.

For fastening the connecting rod cap to the connecting rod foot 2, tension bolts or screws 6, which have fitted surfaces 7 extend through openings 8 in the connecting rod bearing cap 3 and the connecting rod foot 2, respectively. A nut 9 is associated with the tension bolt 6 and, together with a washer 10, is tensioned at a counter-surface 11 of the connecting rod foot 2.

The counter-surface 11 is constructed as a concave spherical surface (shown in dot-dash lines) and changes uniformly over into the surface 12 of the connecting rod foot 2. Correspondingly, the support surface 13 of the washer 10 is constructed as a spherical surface. The radius of the spherical surface 11 of connecting rod foot 2 is slightly smaller than the radius of the support surface 13 of washer 10 directly supported therein. The heat 14 of the tension bolt or screw 6 is provided with a convex support surface 5 of circular cylindrical shape on the side thereof adjacent the connecting rod bearing cap. A corresponding counter-surface 16 of the same character faces the support surface 15 at the connecting rod bearing cap 3. The counter-surface 16 changes in a uniform transition over into the convexly curved surface 17 of the connecting rod bearing cap 3.

For assembly of the connecting rod, the connecting rod bearing cap 3, together with the connecting rod bearing shells (not shown), are first brought into face contact with the connecting rod foot 2. After passing the tension bolt 6 through the opening 8 of respectively the connecting rod bearing cap 3 and the connecting rod foot 2, the washer 10 is put into place. By screwing the nut 9 onto the tension bolt 6 and tightening the same against the washer 10, the connecting rod foot 2 and the connecting rod bearing cap 3 are tensioned against each other without requiring special means to prevent the tension bolt 6 from turning or becoming loose.

Figure 2:
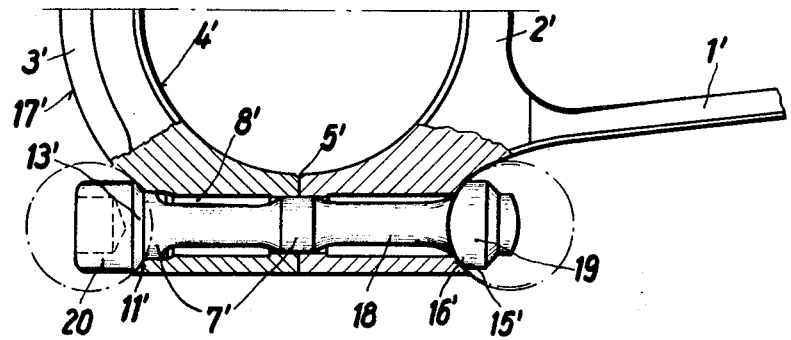
FIG. 2 is a partial cross-sectional view through the other half of the symmetrical, forked connecting rod according to FIG. 1 including a modified bolting method in accordance with the present invention.

The modified embodiment of the connecting rod shown in FIG. 2 is of the same basic construction as the connecting rod shown in FIG. 1 so that the same parts are designated with the same reference numerals but with a prime being added. For fastening of the connecting rod bearing cap 3' to the connecting rod foot 2', tension bolts or screws 18, which include fitted surfaces 7', are passed through openings 8' in the connecting rod bearing cap 3' and the connecting rod foot 2', respectively. A nut 19 is associated with the tension bolt 18, and the latter is tensioned onto a counter-surface 16' of the connecting rod foot 2'. The counter-surface 16' is machined so as to be circular-cylindrically concave. Correspondingly, the support surface 15' of nut 19 is also machined as a cylindrical surface.

The head 20 of the tension bolt 18 is provided, at the side thereof adjacent to the connecting rod bearing cap 3', with a convex support surface 13' having a ball shape. Facing the support surface 13' is a corresponding counter-surface 11' of the same type or condition at the connecting rod bearing cap 3'. The counter-surface 11' passes uniformly over into the convexly curved surface 17' of the connecting rod bearing cap 3'. Assembly of the connecting rod of FIG. 2 corresponds essentially to the description of the connecting rod in accordance with FIG. 1.

While we have shown and described several embodiments in accordance with the present invention, it is to be clearly understood that the same is susceptible of numerous changes and modifications. For example, it is possible to use tension bolts which are directly screw jointed into the connecting rod bearing cap and in the connecting rod foot, respectively. The head of the tension bolt or screw may be provided with a ball-shaped support surface with a ball-shaped washer or may cooperate with a circular cylindrical washer. Further, one part of the tension bolt may be connected to the connecting rod bearing cap or connecting rod foot by means of material closure, such as, for example, integral casting and may cooperate with a washer having a ball-shaped support surface or a nut and washer with ball-shaped or circular-cylindrical support surfaces. Accordingly, we do not wish to be limited to the details shown and described herein but intend to cover all such changes and modifications as are encompassed by the scope of the present invention.

We claim:

1. Connecting rod, especially a forked connecting rod, comprising a connecting rod foot, a connecting rod bearing cap, and tension means for joining the connecting rod foot and the connecting rod bearing cap, characterized in that the tension means includes a bolt having a head portion, a shank portion, and nut means adapted to be secured on the shank portion, one of the head portion and nut means being provided with a convex circular-cylindrical support surface and being supported on a concave circular-cylindrical support surface at one of the connecting rod bearing cap and the connecting rod foot, and the other of the head portion and the nut means being provided with a convex spherical-shaped support surface and being supported on a concave spherical-shaped counter-surface at the other of the connecting rod bearing cap and the connecting rod foot.

2. Connecting rod according to claim 1, wherein the head portion and the connecting rod bearing cap are provided with circular-cylindrical support surfaces, and the nut means and the connecting rod foot are provided with spherical-shaped support surfaces.

3. Connecting rod according to claim 1, wherein the head portion and the connecting rod bearing cap are provided with spherical-shaped support surfaces, and the nut means and the connecting rod foot are provided with circular-cylindrical support surfaces.

4. Connecting rod according to claim 2, wherein the nut means includes a nut having a flat support surface and a washer having a flat support surface adjacent to the nut and a convex spherical-shaped support surface adjacent to the concave spherical-shaped counter-surface at the connecting rod foot.

5. Connecting rod according to claim 2, wherein the radii of the convex support surfaces are slightly larger than the radii of the concave support surfaces corresponding thereto.

6. Connecting rod according to claim 1, wherein the connecting rod foot and the connecting rod bearing cap are each provided with a bore through which the bolt passes, the shank portion of the bolt having a cylindrical mid-portion which is enlarged with respect to the remainder of the shank portion, the mid-portion having a diameter corresponding to the diameter of a part of each of the bores of the connecting rod foot and the connecting rod bearing cap for ensuring alignment of the bores when the bolt passes therethrough.

7. Connecting rod according to claim 1, wherein the head portion is integrally formed with the shank portion of the bolt.

* * * * *